United States Patent
Sodhi et al.

(10) Patent No.: US 12,015,659 B2
(45) Date of Patent: Jun. 18, 2024

(54) OPTIMIZED TRANSMISSION AND CONSUMPTION OF DIGITAL CONTENT

(71) Applicant: International Business Machines Corporation, Armonk, NY (US)

(72) Inventors: Manjit Singh Sodhi, Bangalore (IN); Rahul Jain, Kolkata (IN); Shashank Mujumdar, Nagpur (IN); Nitin Gupta, Saharanpur (IN); Prerna Agarwal, New Delhi (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/680,438

(22) Filed: Feb. 25, 2022

(65) Prior Publication Data
US 2023/0275947 A1    Aug. 31, 2023

(51) Int. Cl.
| | |
|---|---|
| *H04L 65/70* | (2022.01) |
| *G06F 16/22* | (2019.01) |
| *G06F 16/70* | (2019.01) |
| *H04L 65/611* | (2022.01) |
| *H04L 65/612* | (2022.01) |

(Continued)

(52) U.S. Cl.
CPC .............. *H04L 65/70* (2022.05); *G06F 16/70* (2019.01); *H04L 65/611* (2022.05); *H04L 65/612* (2022.05); *H04N 21/236* (2013.01); *H04N 21/266* (2013.01); *G06F 16/2264* (2019.01)

(58) Field of Classification Search
CPC ..... H04L 65/70; H04L 65/612; H04L 65/611; G06F 16/70; H04N 21/266; H04N 21/236
See application file for complete search history.

(56) References Cited

U.S. PATENT DOCUMENTS

| | | | | |
|---|---|---|---|---|
| 5,047,858 A | * | 9/1991 | Aimonoya | ............... H04N 5/45 348/568 |
| 5,289,288 A | | 2/1994 | Silverman | |

(Continued)

FOREIGN PATENT DOCUMENTS

| | | | | |
|---|---|---|---|---|
| CN | 102957950 A | | 3/2013 | |
| EP | 2536155 B1 | * | 3/2017 | ......... G02B 27/2264 |
| WO | WO-2012018669 A2 | * | 2/2012 | ......... G02B 27/2264 |

OTHER PUBLICATIONS

"Extending Hololens Gestures with Deep Learning AI," downloaded from the Internet Feb. 2, 2022, 4 pages, Valorem Reply Digital Transformation Partner, <https://www.valoremreply.com/post/extendinghololensgestures/>.

(Continued)

*Primary Examiner* — James R Sheleheda
(74) *Attorney, Agent, or Firm* — Heather Johnston

(57) ABSTRACT

A system may include a memory and a processor in communication with the memory. The processor may be configured to perform operations. The operations may include extracting a first multiple dimensional dataset and a second multiple dimensional dataset and encoding the first multiple dimensional dataset into a first encoded dataset and the second multiple dimensional dataset into a second encoded dataset. The operations may include combining the first encoded dataset and the second encoded dataset into a combined encoded dataset and conveying the combined encoded dataset to a user.

20 Claims, 7 Drawing Sheets

(51) Int. Cl.
*H04N 21/236* (2011.01)
*H04N 21/266* (2011.01)

(56) References Cited

U.S. PATENT DOCUMENTS

| | | | | |
|---|---|---|---|---|
| 8,610,759 | B2* | 12/2013 | McKiel, Jr. | H04N 13/183 348/51 |
| 8,665,291 | B2* | 3/2014 | Zalewski | H04N 13/351 345/590 |
| 8,687,054 | B1* | 4/2014 | Elwell | H04N 21/23439 348/42 |
| 8,724,026 | B2* | 5/2014 | Macleod | G09G 5/18 348/588 |
| 9,247,240 | B2* | 1/2016 | Park | H04N 13/398 |
| 9,575,336 | B1* | 2/2017 | Cao | G02F 1/09 |
| 9,639,881 | B2* | 5/2017 | Zhu | G06Q 30/0623 |
| 9,756,224 | B2 | 9/2017 | Macleod | |
| 10,089,896 | B2 | 10/2018 | Chetlur | |
| 10,666,903 | B1 | 5/2020 | Wu | |
| 10,887,362 | B2 | 1/2021 | Vansa | |
| 10,893,263 | B2* | 1/2021 | Cichonski | H04N 13/398 |
| 11,025,892 | B1* | 6/2021 | Aman | H04N 21/458 |
| 2002/0194476 | A1* | 12/2002 | Lewis | H04L 9/3247 713/169 |
| 2003/0009771 | A1* | 1/2003 | Chang | H04N 21/4438 725/135 |
| 2003/0133569 | A1* | 7/2003 | Stern | G06F 21/84 348/E13.059 |
| 2004/0056948 | A1* | 3/2004 | Gibson | H04N 13/341 348/E13.044 |
| 2004/0181800 | A1* | 9/2004 | Rakib | H04N 21/6118 725/100 |
| 2005/0097340 | A1* | 5/2005 | Pedlow | H04N 21/23476 348/E7.06 |
| 2007/0061862 | A1* | 3/2007 | Berger | H04N 7/163 725/62 |
| 2007/0107019 | A1* | 5/2007 | Romano | H04N 5/782 725/135 |
| 2007/0153122 | A1* | 7/2007 | Ayite | H04N 13/354 348/55 |
| 2008/0008319 | A1* | 1/2008 | Poirier | H04L 9/0891 348/E7.056 |
| 2008/0120667 | A1* | 5/2008 | Zaltsman | H04N 21/43615 348/E5.003 |
| 2008/0155615 | A1* | 6/2008 | Craner | H04N 7/17318 348/E7.071 |
| 2008/0216138 | A1* | 9/2008 | Minnick | H04N 21/6143 725/110 |
| 2008/0320543 | A1* | 12/2008 | Wang | H04N 21/4122 725/131 |
| 2010/0177174 | A1* | 7/2010 | Ko | H04N 13/354 348/56 |
| 2011/0157194 | A1* | 6/2011 | Eisenbach | H04N 19/423 345/522 |
| 2011/0159929 | A1* | 6/2011 | Karaoguz | H04N 13/315 715/764 |
| 2011/0169930 | A1* | 7/2011 | Bennett | H04N 13/383 348/59 |
| 2011/0211049 | A1* | 9/2011 | Bassali | H04N 13/327 348/51 |
| 2012/0013746 | A1* | 1/2012 | Chen | H04N 21/8456 348/180 |
| 2012/0026396 | A1* | 2/2012 | Banavara | H04N 13/398 348/E5.009 |
| 2013/0050573 | A1* | 2/2013 | Syed | H04N 13/194 348/E7.003 |
| 2013/0070924 | A1* | 3/2013 | Bertin | G06F 21/34 380/211 |
| 2013/0235152 | A1 | 9/2013 | Hannuksela | |
| 2016/0142785 | A1* | 5/2016 | Nguyen | H04N 21/454 725/27 |
| 2017/0124349 | A1 | 5/2017 | Anantapur Bache | |
| 2017/0163900 | A1* | 6/2017 | Gaetje | G02C 7/12 |
| 2017/0195666 | A1* | 7/2017 | Konakalla | A63F 13/52 |
| 2018/0063476 | A1* | 3/2018 | Cichonski | H04N 21/43072 |
| 2018/0247672 | A1* | 8/2018 | Doyle | H04N 21/2365 |
| 2022/0321906 | A1* | 10/2022 | Misra | G06T 9/002 |

OTHER PUBLICATIONS

Grimaldi, Emma, "How to build a content-based movie recommender system with Natural Language Processing," Oct. 1, 2018, 12 pages, <https://towardsdatascience.com/how-to-build-from-scratch-a-content-based-movie-recommender-with-natural-language-processing-25ad400eb243>.

Mell et al., "The NIST Definition of Cloud Computing", Recommendations of the National Institute of Standards and Technology, NIST Special Publication 800-145, Sep. 2011, 7 pages.

Swanner, Nate, "Microsoft Adds Neural Networking to Hololens," Jul. 25, 17, 6 pages, <https://insights.dice.com/2017/07/25/hololens-mixed-reality-neural-network/>.

Vovk, Martin, "Microsoft Hololens 2—Mixed Reality headset designed to get work done," Feb. 11, 2021, BEterna, 7 pages, <https://www.be-terna.com/insights/microsoft-hololens-2-mixed-reality-headset-designed-to-get-work-done>.

\* cited by examiner

400

- 410 Feedback Collection
  - 420 Import Ratings Profile
  - 430 Manual Rating of Watched Program(s)
  - 440 Provide Recommendation Feedback
  - 450 Calculate Attention-Based Rating
    - 452 Track Decoding Time Data
    - 454 Identify Frequency and Length of Viewer Inattention
    - 456 Compute Attention-Based Viewer Interest Rating
- 460 Recommendation Personalization

FIG. 4

OPTIMIZED TRANSMISSION AND CONSUMPTION OF DIGITAL CONTENT

BACKGROUND

The present disclosure relates to digital content and more specifically to transmission and consumption of digital content.

Content may be available digitally and stored on devices as digital content. Content, such as digital content, may be stored in a location. An individual may desire to access the content in a location other than the location where the content was stored. Digital content may be transmitted between devices. Digital content may be compiled, encoded, encrypted, compressed, formatted, or otherwise prepared for transmission between devices. After transmission of digital content, the digital content may be decompiled, decoded, decrypted, decompressed, re-formatted, or otherwise prepared for user consumption.

SUMMARY

Embodiments of the present disclosure include a system, method, and computer program product for optimized transmission and consumption of digital content. A system in accordance with the present disclosure may include a memory and a processor in communication with the memory. The processor may be configured to perform operations. The operations may include extracting a first multiple dimensional dataset and a second multiple dimensional dataset and encoding the first multiple dimensional dataset into a first encoded dataset and the second multiple dimensional dataset into a second encoded dataset. The operations may include combining the first encoded dataset and the second encoded dataset into a combined encoded dataset and conveying the combined encoded dataset to a user.

In some embodiments of the present disclosure, the operations may include decoding the combined encoded dataset. In some embodiments, the operations may include revealing the first encoded dataset by decoding the combined encoded dataset. In some embodiments, the combined encoded dataset may be decoded using a wearable device. In some embodiments, the wearable device may decode the combined encoded dataset to reveal the first encoded dataset. In some embodiments, the wearable device may decode the combined encoded dataset with a decoding key personalized to the user.

In some embodiments of the present disclosure, the first multiple dimensional dataset may be a video. In some embodiments, the video may be encoded at a frame level of granularity.

In some embodiments of the present disclosure, the combined encoded dataset may be conveyed to a user with a smart device.

The above summary is not intended to describe each illustrated embodiment or every implement of the disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 4 depicts a feedback method for a system in accordance with some embodiments of the present disclosure.

Figure 1:
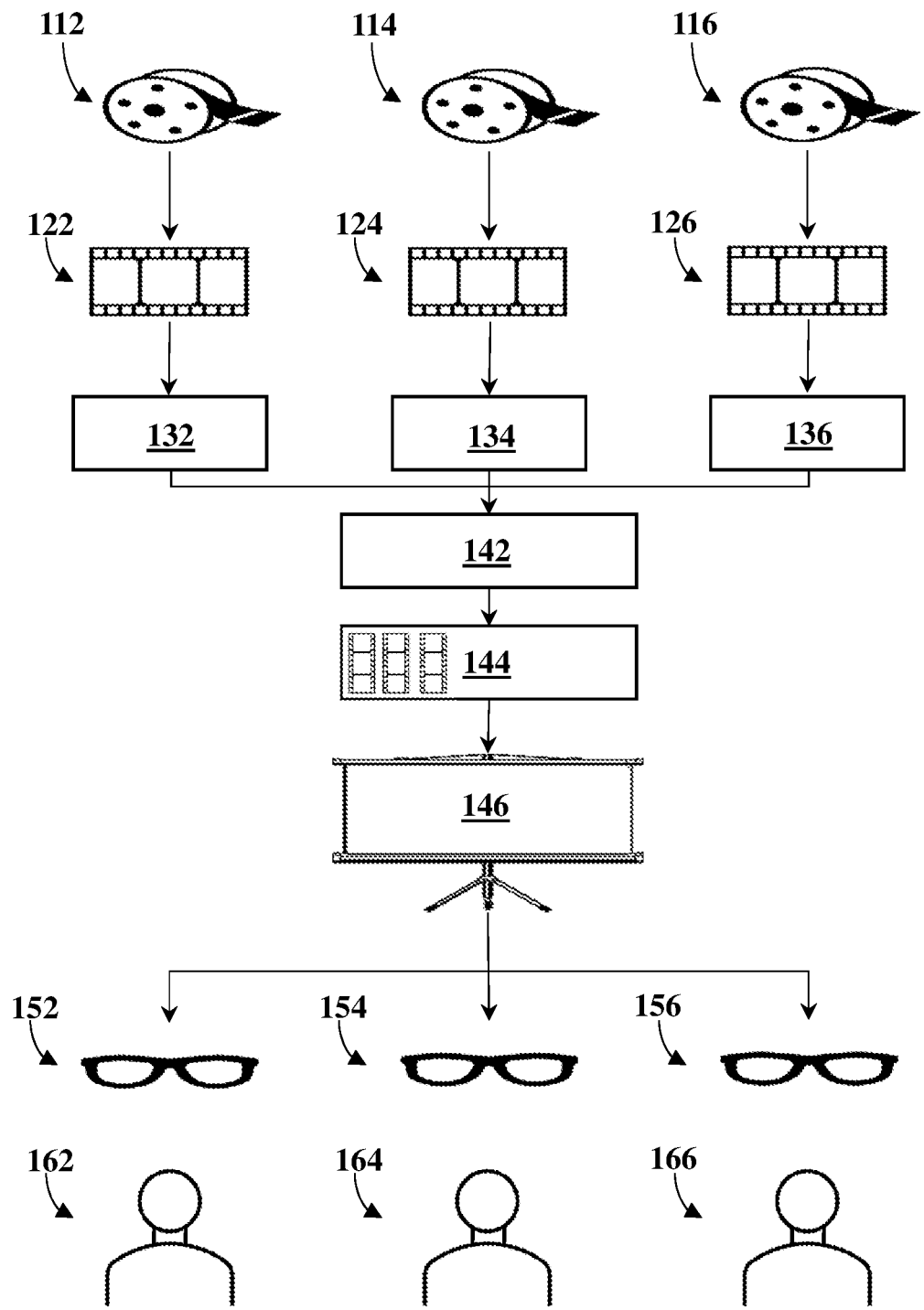
FIG. 1 illustrates a digital content transmission system in accordance with some embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to digital content and more specifically to transmission and consumption of digital content.

Multidimensional data may be encoded, combined, and sent to a recipient to consume the individually decoded multidimensional data. For example, videos are multidimensional; multiple videos may be encoded, combined, sent to a viewer, and the viewer may view one video at a time by individually decoding the combined encoded videos.

In some embodiments of the present disclosure, a single screen may be utilized to simultaneously show multiple videos. Such a mechanism may be employed by encoding multiple videos into a single video and decoding the individual videos with a unique key. Encoding multiple videos into a single video and decoding the videos individually may be used to protect against piracy, enhance space utilization, solve issues of different user interest, and the like. In some embodiments, users may use a wearable device to decode the encoded video on the screen.

The present disclosure discusses encoding multiple sets of multidimensional data into a singular dataset (e.g., multiple videos into a single video). Each encoded multidimensional dataset (e.g., video) may use a unique key for decoding.

In some embodiments of the present disclosure, piracy may be countered. For example, if a person tries to record a screen displaying the content, encoded images (e.g., garbage pixels) will be recorded rather than useful content. In some embodiments, the disclosure enhances space utilization. For example, individuals with independent wearable devices may simultaneously view different videos from the same encoded sequence display. In some embodiments, varying user interest may be accommodated as multiple users may share one screen to watch different videos.

In some embodiments of the present disclosure, network bandwidth may be preserved. For example, multiple videos may be encoded into single video combination; the user may download the single video combination to view one or more of the videos offline using different decoders to watch the videos separately.

Some embodiments of the present disclosure may enable the avoidance of product piggybacking. For example, a user may decode a video using a decoder wearable device; a viewer without a wearable device with a proper decoder may thus be unable to view the content. In some embodiments, the user may be limited to sharing content to others with the correct decoder for the specific content. For example, a parent may grant viewership permissions to children based on the age of the child; a younger sibling may be prevented from viewing the content enabled for an older sibling without access to the wearable device of the older sibling. Moreover, in some embodiments, such a mechanism may enable richer data collection which may result in better user recommendations; for example, a system using the present disclosure may identify that a specific user is watching specific content and therefore is likely interested in similar content.

In some embodiments of the present disclosure, a user may use a wearable device. The user may select a decoding key based on a video of interest. Based on the selected key, only the unique video corresponding to the selected video is decoded.

The present disclosure presents a system and method for optimized transmission and/or consumption of digital content with a variety of uses. For example, the present disclosure may be used for online streaming to preserve bandwidth, protect against piracy, and assist against piggybacking. For example, the present disclosure may be used for watching multiple programs on one television at the same time. For example, a cinema may use the present disclosure to show multiple movies on the same screen simultaneously.

The present disclosure considers a framework of discovering timely subset of videos with high chances of being viewed by a user group (e.g., similar ages, interests, and geographic locations). Once identified, the videos may be encoded, combined, and streamed as a combined encoded video. The combined encoded video may be decoded via a smart device (e.g., a wearable device worn by a user) based on user interest (e.g., based on a user interest profile) for viewing. A user may manually select between videos (e.g., decide which video to decode and watch) or may enable automatic playback based on a user profile assessment and identification of the video the user most likely wants to watch (e.g., based on a user interest profile).

The present disclosure considers personalizing multiple datasets (e.g., videos) for encoding based on a user interest profile. An encoded dataset may be automatically decoded via a user device (e.g., a user smart wearable device) based on known user interest (e.g., ratings indicating preference) or recommendations for the user based on an analysis of user history.

In some embodiments, a system in accordance with the present disclosure may cognitively generate video bundling rules for videos to be encoded together through dynamic user profile synthesis. Rules may be determined based on several factors. For example, rules may consider legal regulations, demographics (e.g., age range, geographic location, and group affiliations), content theme (e.g., educational, entertainment, political, or religious), user settings (e.g., sharing content with specified other users via invitation), and other factors.

In some embodiments, a system in accordance with the present disclosure may encode the videos at frame level. In some embodiments, a combined encoder, combined decoder, and/or combined encoder/decoder may be derived for the set of videos. A combined encoder may be used to enable the download and/or streaming of encoded video.

In some embodiments, encoded metadata (e.g., user preferences and/or user history analysis) may be shared with a smart viewing device (e.g., viewing goggles or smart television). Based on the metadata received, the viewing device may apply a suitable decoder to decode a video for viewing.

The present disclosure considers the generation personalized ratings of content. Personalized rating generation may be based on user groups, affinities, similarities, and other personalization-enabling information. Personalization rating generation may consider multiple factors which a system in accordance with the present disclosure may track. In particular, a system in accordance with the present disclosure may identify user group viewer content and viewer attention-based decoding.

User group viewer content may be the identification of a certain user group consuming content simultaneously; for example, a group of five friends may be considered a user group because they watch one or more movies together, and a group of three colleagues may be considered another user group because they watch some training sessions together. A user group-based personalized rating system may be used as feedback for user group identification and a subsequent video bundling mechanism (e.g., for cognitively generating video bundling rules for videos to be encoded together through dynamic user profile synthesis).

Viewer attention-based decoding may use information about the focus of the viewer on content. For example, a viewer may wear decoding goggles, and the decoding goggles may track how frequently and for how long the decoding goggles are not aimed at the viewscreen while a program is running. Viewer attention-based decoding may be used to generate a rating based on how closely the viewer appeared to focus on the content.

The amount of time a device (e.g., decoding glasses) does not decode content including, for example, the frequency of non-decoding time and the amount of time of each non-decoding time segment. This may be based on what is tracked in a single video. For example, how much time a viewer watches a screen while a program is being played may be used to generate a rating. If a viewer is particularly interested in content, then the viewer is very likely to focus on the content as it runs; however, if a viewer is not interested in content, the viewer is likely to engage more frequently with distractions (e.g., phone notifications) and thus look away from the screen. A wearable device may track when the viewer appears to be looking toward a screen and thereby calculate an estimated level of interest in the played programming.

In some embodiments of the present disclosure, the disclosure enables context aware and piracy-free optimized transmission and consumption of digital content.

In some embodiments of the present disclosure, the disclosure may include a framework for discovering a timely subset of videos which may have a high chance of being viewed by the user or user group (e.g., individuals of the same age, interest profiles, geographic location, and the like). Such an embodiment may enable combined encoding and streaming of the videos; the combined, encoded videos may be decoded in the smart wearable device of each user. In some embodiments, the decoding of the videos may be based on user interest which may be based on, for example, a user profile. In some embodiments, the user interest may identify the likelihood that the user will be interested in one or more videos in the combined, encoded video.

Some embodiments of the present disclosure may include personalizing the multiple video encoding based on a user group profile. In some embodiments, the encoded video may be streamed, and the streamed video may be automatically decoded via a user smart wearable device. The video may be selected based on an identified video of interest to the user (e.g., based on a user profile). In some embodiments, the video may be selected via recommendation based on an analysis of the viewing and/or attention history of the user.

Some embodiments of the present disclosure may include cognitively generating video bundling rules for videos to be encoded together through dynamic user profile synthesis. In some embodiments, rules may be formed based on one or more factors including, for example, legal regulations, age group, demographic preferences, theme (e.g., genre), copyright, privacy availability (e.g., invitation from another user to simultaneously watch a program), and the like.

In some embodiments of the present disclosure, the disclosure may include encoding one or more videos at frame level and deriving a combined encoder and combined decoder for the set of videos. In some embodiments, a combined encoder may be used to enable the download and streaming of encoded video.

In some embodiments of the present disclosure, a user may share encoded metadata information (e.g., user time preference to watch a certain video genre). In some embodiments, the metadata may be derived from user history. In some embodiments, based on the metadata received, the user may apply a suitable decoder to a wearable device to enable the decoding of a video of interest for viewing by the viewer.

In some embodiments of the present disclosure, personalized rating generation may be achieved by considering one or more important factors; the factors may be identified via user input, user history, or other manual or automatic feature of the present disclosure. In some embodiments, a personalized rating may be based on one or more groups a user enters into a user profile.

In some embodiments of the present disclosure, attention-based decoding may be used to generate ratings based on the amount of user focus on content shown. For example, in some embodiments, a wearable device may track that a user spends an average of 8% of a movie runtime looking away from the video (e.g., responding to text messages and otherwise not looking at the screen); the wearable device may identify that the user spends 23% of a movie runtime looking away from the video and deduces that the user is less interested in the movie than the average movie selected because of the decrease in screen focus. In some embodiments, a device in accordance with the present disclosure may identify how much time a wearable does and does not decode content; based on this information, the device may identify how much time a user focused on the video content.

A system in accordance with the present disclosure may include a memory and a processor in communication with the memory. The processor may be configured to perform operations. The operations may include extracting a first multiple dimensional dataset and a second multiple dimensional dataset and encoding the first multiple dimensional dataset into a first encoded dataset and the second multiple dimensional dataset into a second encoded dataset. The operations may include combining the first encoded dataset and the second encoded dataset into a combined encoded dataset and conveying the combined encoded dataset to a user.

In some embodiments of the present disclosure, the operations may include decoding the combined encoded dataset. In some embodiments, the operations may include revealing the first encoded dataset by decoding the combined encoded dataset. In some embodiments, the combined encoded dataset may be decoded using a wearable device. In some embodiments, the wearable device may decode the combined encoded dataset to reveal the first encoded dataset. In some embodiments, the wearable device may decode the combined encoded dataset with a decoding key personalized to the user.

In some embodiments of the present disclosure, the first multiple dimensional dataset may be a video. In some embodiments, the video may be encoded at a frame level of granularity.

In some embodiments of the present disclosure, the combined encoded dataset may be conveyed to a user with a smart device.

FIG. 1 illustrates a digital content transmission system 100 in accordance with some embodiments of the present disclosure. Videos 112, 114, and 116 are input into the system 100 for encoding, transmission, and display to viewers 162, 164, and 166.

Videos 112, 114, and 116 are submitted to the system 100 and the frames 122, 124, and 126 are extracted from the videos 112, 114, and 116. The frames 122, 124, and 126 extracted from the videos 112, 114, and 116 are each encoded using an encoder/decoder 132, 134, and 136 to obtain encoded videos which are encoded at the frame level of granularity. The encoded videos are submitted to a combined encoder/decoder 142 to combine the encoded videos into a combined encoded video 144 with the data of each of the original input videos 112, 114, and 116. The combined encoded video 144 is conveyed to users 162, 164, and 166.

In FIG. 1, the combined encoded video 144 is conveyed to the viewers by projection onto a projection screen 146 and the users 162, 164, and 166 wear individual decoding devices 152, 154, and 156 (e.g., decoder glasses) to decode the combined encoded video 144 into the video 112, 114, or 116 of interest to the specific viewer 162, 164, and 166. In some embodiments, the combined encoded video 144 may be streamed to a smart device (e.g., a smart television) and the smart device may decode the video 112, 114, or 116 of interest to the viewer(s) such that only one of the original input videos 112, 114, or 116 will be viewable at a time on the smart device. In some embodiments, the encoded video 144 may be played on a smart device and displayed on the smart device without being decoded; a viewer 162, 164, or 166 may decode and view the video 112, 114, or 116 of interest using a wearable device 152, 154, or 156. In some embodiments, the encoded video 144 may be decoded and displayed such that one video 112, 114, or 116 is displayed on a screen and a viewer may use a device (e.g., wear decoding goggles) to view another video 112, 114, or 116 embedded in the encoded video 144.

Figure 2:
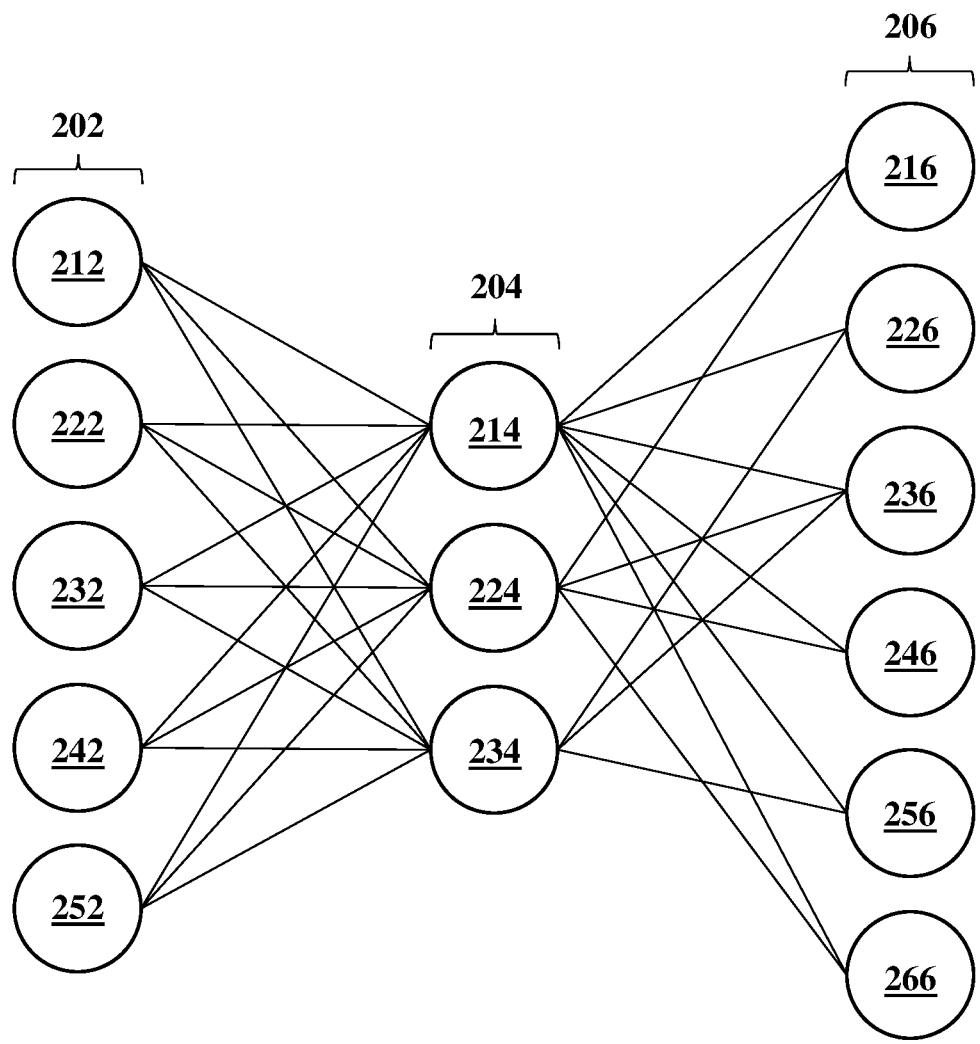
FIG. 2 depicts an encoding and decoding system in accordance with some embodiments of the present disclosure.

FIG. 2 depicts an encoding and decoding system 200 in accordance with some embodiments of the present disclosure. The encoding and decoding system 200 includes a data layer 202, an encoded data layer 204, and a decoded data layer 206.

Datasets 212, 222, 232, 242, and 252 in the data layer 202 are submitted to an encoder. The encoder encodes the datasets 212, 222, 232, 242, and 252 into encoded datasets 214, 224, and 234 in the encoded data layer 204. Each encoded dataset 214, 224, and 234 may include one or more of the datasets 212, 222, 232, 242, and 252 encoded by the encoder. The encoded datasets 214, 224, and 234 may be submitted to a decoder. The decoder may decode one or more of the encoded datasets 214, 224, and 234 into one or more decoded datasets 216, 226, 236, 246, 256, and 266 in the decoded data layer 206. The decoded datasets 216, 226, 236, 246, 256, and 266 may each include one or more of the encoded datasets 214, 224, and 234.

In some embodiments of the present disclosure, additional intermediate layers (e.g., encoding, combining, transmitting, et cetera) may be used. In some embodiments, the data layer 202 may include multiple dimensional datasets (e.g., videos). The multiple dimensional datasets may be encoded by an encoder and then combined into an encoded dataset such as shown by the system 100 in FIG. 1. In some embodiments, the datasets 212, 222, 232, 242, and 252 may be combined by a data combining unit and then encoded into encoded datasets 214, 224, and 234. In some embodiments, the data layer 202 may be combined and encoded simultaneously, and/or the data layer may be combined and encoded by a singular component.

The present disclosure includes a computer-implemented method for the optimization of digital content transmission and/or consumption. A computer-implemented method in accordance with the present disclosure may include extracting a first multiple dimensional dataset and a second multiple dimensional dataset and encoding the first multiple dimensional dataset into a first encoded dataset and the second multiple dimensional dataset into a second encoded dataset. The operations may include combining the first encoded dataset and the second encoded dataset into a combined encoded dataset and conveying the combined encoded dataset to a user.

In some embodiments of the present disclosure, the operations may include decoding the combined encoded dataset. In some embodiments, the operations may include revealing the first encoded dataset by decoding the combined encoded dataset. In some embodiments, the combined encoded dataset may be decoded using a wearable device. In some embodiments, the wearable device may decode the combined encoded dataset to reveal the first encoded dataset. In some embodiments, the wearable device may decode the combined encoded dataset with a decoding key personalized to the user.

In some embodiments of the present disclosure, the first multiple dimensional dataset may be a video. In some embodiments, the video may be encoded at a frame level of granularity.

In some embodiments of the present disclosure, the combined encoded dataset may be conveyed to a user with a smart device.

Figure 3:
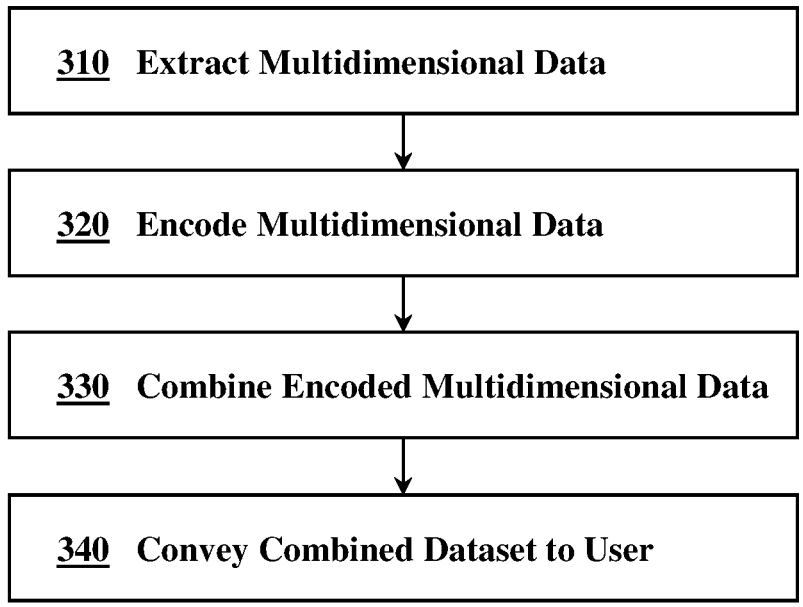
FIG. 3 illustrates a method for digital content transmission in accordance with some embodiments of the present disclosure.

FIG. 3 illustrates a computer-implemented method 300 for digital content transmission in accordance with some embodiments of the present disclosure. The method 300 includes extracting 310 multiple dimensional data, encoding 320 the multiple dimensional data, combining 330 the encoded multiple dimensional data into a combined and encoded dataset, and conveying 340 the combined and encoded dataset to a user.

In some embodiments of the present disclosure, the extracting 310, encoding 320, combining 330, and conveying 340 may all be performed by one system. For example, a system may perform the extracting 310 multidimensional data, encoding 320 the extracted multiple dimensional data, combining 330 the encoded multiple dimensional data, and conveying 340 of the combined dataset to a user. In some embodiments, the method 300 components may be performed with units from more than one system; for example, an extraction unit in one system may perform the extracting 310 and then submit the data to another system with an encoder to perform the encoding 320.

The method 300 may be performed using a system with encoders, decoders, and a mechanism for displaying data to one or more users. For example, the method 300 may be performed on a system such as the system 100 shown in FIG. 1 which may use an encoding and decoding system such as the encoding and decoding system 200 shown in FIG. 2.

FIG. 4 depicts a feedback method 400 which may be used for a system in accordance with some embodiments of the present disclosure. The feedback method 400 includes feedback collection 410 and recommendation personalization 460.

The feedback collection 410 may include the system importing 420 a user ratings profile, the user manually rating 430 one or more watched programs, a user providing 440 feedback about recommendations made by the system, and the system calculating 450 a rating of a program for the user based on the attention of the user on the program. In some embodiments, some feedback collection 410 mechanisms may not be used; for example, a new user may not have a ratings profile to import such that the importing 420 would not occur. In some embodiments, other mechanisms may be used for feedback collection 410 based on availability of other data.

Calculating 450 the attention-based rating for the user includes the user using the system (e.g., a system such as the one shown in FIG. 1) and the system tracking 452 the time the decoder decodes the data. For example, the user may wear a wearable device, and the wearable device may track how long the user is viewing the data viewscreen (e.g., track the time the wearable device is decoding the data on the viewscreen); the wearable device may also track how long the user is not viewing the data viewscreen (e.g., track the time the wearable device is not decoding the data because the user is looking elsewhere). Calculating 450 the attention-based rating may include identifying 454 the frequency and length of viewer inattention to the program. Calculating 450 the attention-based rating may include computing 456 an attention-based viewer rating based on the tracked decoding time and the identified inattention time.

A computer program product in accordance with the present disclosure may include a computer readable storage medium having program instructions embodied therewith. The program instructions may be executable by a processor to cause the processor to perform a function. The function may include extracting a first multiple dimensional dataset and a second multiple dimensional dataset and encoding the first multiple dimensional dataset into a first encoded dataset and the second multiple dimensional dataset into a second encoded dataset. The function may include combining the first encoded dataset and the second encoded dataset into a combined encoded dataset and conveying the combined encoded dataset to a user.

In some embodiments of the present disclosure, the function may include decoding the combined encoded dataset. In some embodiments, the function may include revealing the first encoded dataset by decoding the combined encoded dataset. In some embodiments, the combined encoded dataset may be decoded using a wearable device. In some embodiments, the wearable device may decode the combined encoded dataset to reveal the first encoded dataset. In some embodiments, the wearable device may decode the combined encoded dataset with a decoding key personalized to the user.

In some embodiments of the present disclosure, the first multiple dimensional dataset may be a video. In some embodiments, the video may be encoded at a frame level of granularity.

In some embodiments of the present disclosure, the combined encoded dataset may be conveyed to a user with a smart device.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment currently known or that which may be later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model with different physical and virtual resources dynamically assigned and reassigned according to demand. There is a sense of portion independence in that the consumer generally has no control or knowledge over the exact portion of the provided resources but may be able to specify portion at a higher level of abstraction (e.g., country, state, or datacenter).

Rapid elasticity: capabilities can be rapidly and elastically provisioned, in some cases automatically, to quickly scale out and rapidly release to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but the consumer has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software which may include operating systems and applications. The consumer does not manage or control the underlying cloud infrastructure but has control over operating systems, storage, and deployed applications, and the consumer possibly has limited control of select networking components (e.g., host firewalls).

Deployment models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and/or compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
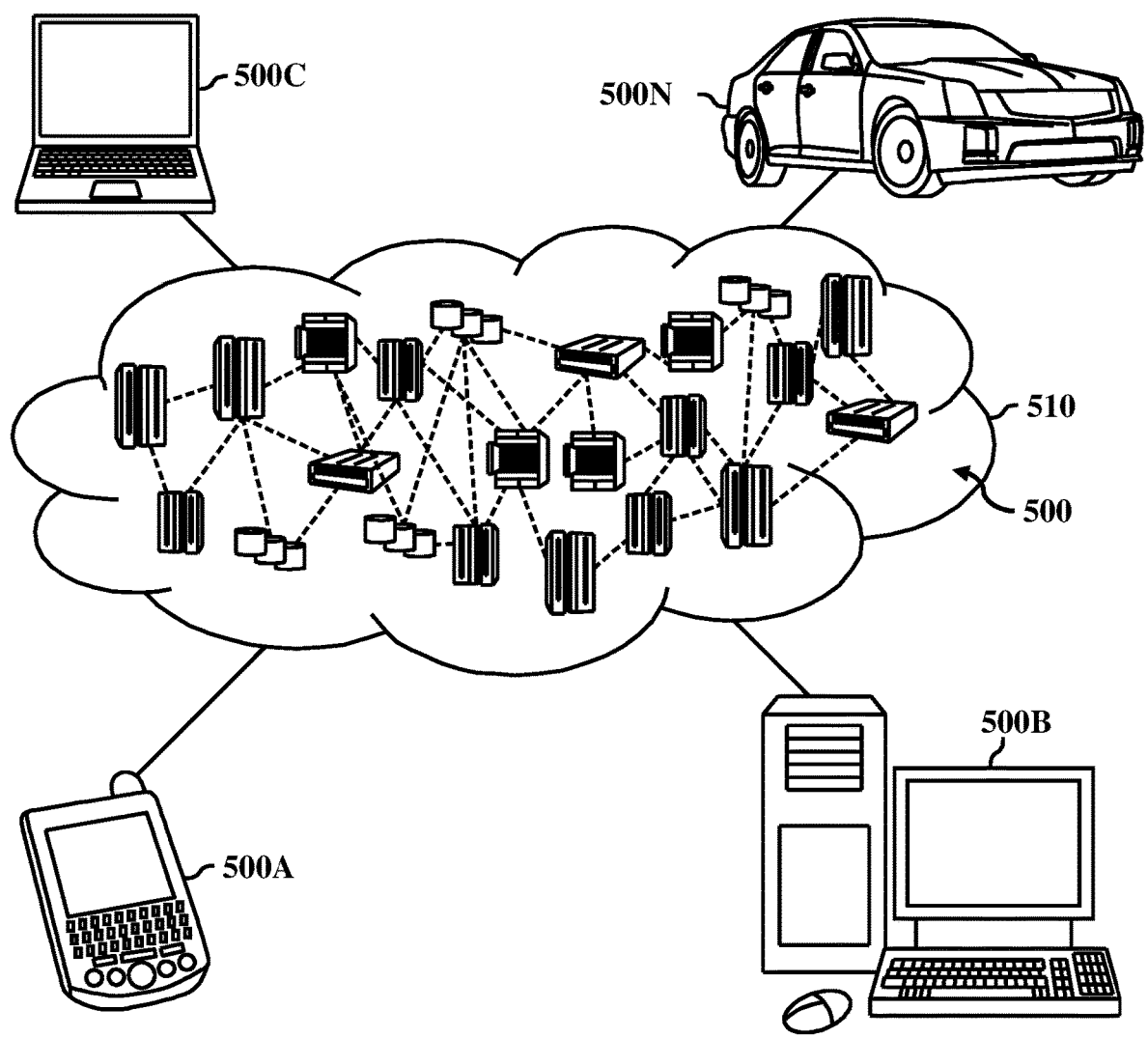
FIG. 5 illustrates a cloud computing environment, in accordance with embodiments of the present disclosure.

FIG. 5 illustrates a cloud computing environment 510 in accordance with embodiments of the present disclosure. As shown, cloud computing environment 510 includes one or more cloud computing nodes 500 with which local computing devices used by cloud consumers such as, for example, personal digital assistant (PDA) or cellular telephone 500A, desktop computer 500B, laptop computer 500C, and/or automobile computer system 500N may communicate. Nodes 500 may communicate with one another. They may be grouped (not shown) physically or virtually, in one or more networks, such as private, community, public, or hybrid clouds as described hereinabove, or a combination thereof.

This allows cloud computing environment 510 to offer infrastructure, platforms, and/or software as services for which a cloud consumer does not need to maintain resources on a local computing device. It is understood that the types of computing devices 500A-N shown in FIG. 5 are intended to be illustrative only and that computing nodes 500 and cloud computing environment 510 can communicate with any type of computerized device over any type of network and/or network addressable connection (e.g., using a web browser).

Figure 6:
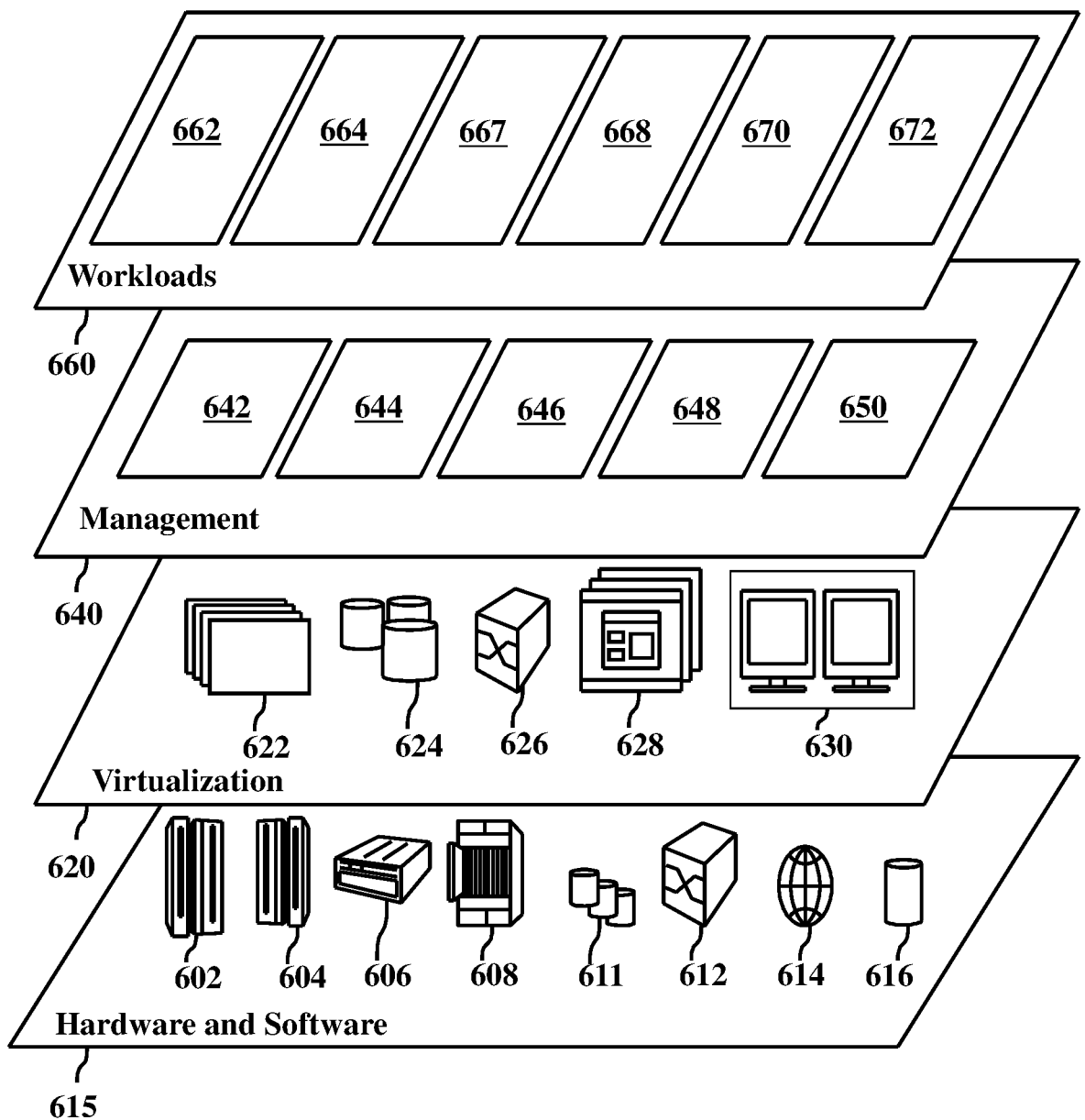
FIG. 6 depicts abstraction model layers of a computing environment, in accordance with embodiments of the present disclosure.

FIG. 6 illustrates abstraction model layers 600 provided by cloud computing environment 510 (FIG. 5) in accordance with embodiments of the present disclosure. It should be understood in advance that the components, layers, and functions shown in FIG. 6 are intended to be illustrative only and embodiments of the disclosure are not limited thereto. As depicted below, the following layers and corresponding functions are provided.

Hardware and software layer 615 includes hardware and software components. Examples of hardware components include: mainframes 602; RISC (Reduced Instruction Set Computer) architecture-based servers 604; servers 606; blade servers 608; storage devices 611; and networks and networking components 612. In some embodiments, software components include network application server software 614 and database software 616.

Virtualization layer 620 provides an abstraction layer from which the following examples of virtual entities may be provided: virtual servers 622; virtual storage 624; virtual networks 626, including virtual private networks; virtual applications and operating systems 628; and virtual clients 630.

In one example, management layer 640 may provide the functions described below. Resource provisioning 642 provides dynamic procurement of computing resources and other resources that are utilized to perform tasks within the cloud computing environment. Metering and pricing 644 provide cost tracking as resources are and are utilized within the cloud computing environment as well as billing or invoicing for consumption of these resources. In one example, these resources may include application software licenses. Security provides identity verification for cloud consumers and tasks as well as protection for data and other resources. User portal 646 provides access to the cloud computing environment for consumers and system administrators. Service level management 648 provides cloud computing resource allocation and management such that required service levels are met. Service level agreement (SLA) planning and fulfillment 650 provide pre-arrangement for, and procurement of, cloud computing resources for which a future requirement is anticipated in accordance with an SLA.

Workloads layer 660 provides examples of functionality for which the cloud computing environment may be utilized. Examples of workloads and functions which may be provided from this layer include: mapping and navigation 662; software development and lifecycle management 664; virtual classroom education delivery 667; data analytics processing 668; transaction processing 670; and optimized digital content transmission and consumption 672.

Figure 7:
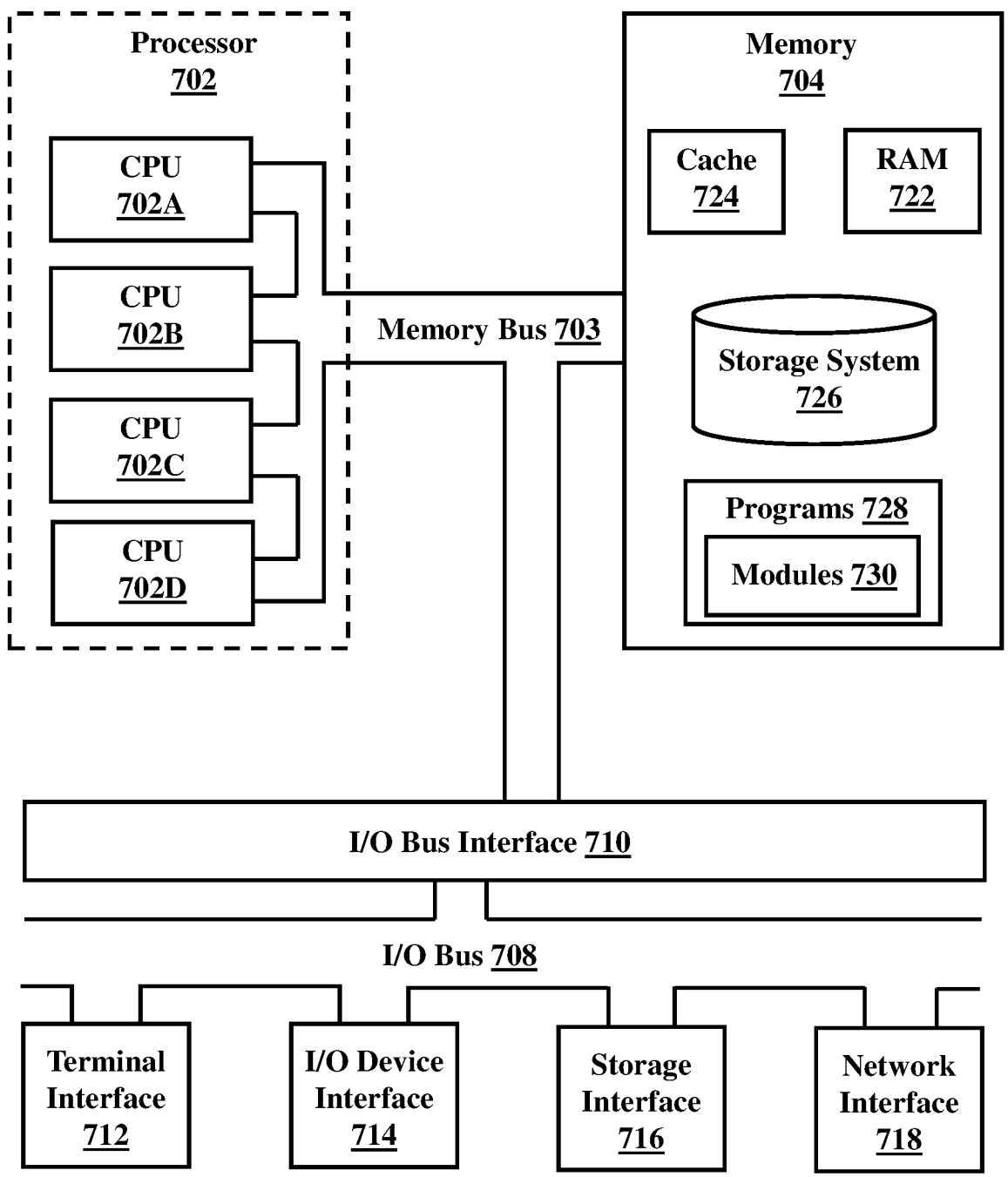
FIG. 7 illustrates a high-level block diagram of an example computer system that may be used in implementing one or more of the methods, tools, and modules, and any related functions, described herein, in accordance with embodiments of the present disclosure.

FIG. 7 illustrates a high-level block diagram of an example computer system 701 that may be used in implementing one or more of the methods, tools, and modules, and any related functions, described herein (e.g., using one or more processor circuits or computer processors of the computer) in accordance with embodiments of the present disclosure. In some embodiments, the major components of the computer system 701 may comprise a processor 702 with one or more central processing units (CPUs) 702A, 702B, 702C, and 702D, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable CPUs 702A, 702B, 702C, and 702D, herein generically referred to as the CPU 702. In some embodiments, the computer system 701 may contain multiple processors typical of a relatively large system; however, in other embodiments, the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM, or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730, may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data, or some combination thereof, may include an implementation of a networking environment. Programs 728 and/or program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star, or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units 710 are shown, which separate the I/O bus 708 from various communications paths running to the various I/O devices, in other embodiments some or all of the I/O devices may be connected directly to one or more system I/O buses 708.

In some embodiments, the computer system 701 may be a multi-user mainframe computer system, a single-user system, a server computer, or similar device that has little or no direct user interface but receives requests from other computer systems (clients). Further, in some embodiments, the computer system 701 may be implemented as a desktop computer, portable computer, laptop or notebook computer, tablet computer, pocket computer, telephone, smartphone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide, or other transmission media (e.g., light pulses passing through a fiber-optic cable) or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer, or entirely on a remote computer or server. In the latter scenario, the remote computer may be connected to the user's computer through any type of network, including a local area network (LAN) or a wide area network (WAN) or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of instructions which comprises one or more executable instructions for implementing the specified logical function(s). In some alternative implementations, the functions noted in the blocks may occur out of the order noted in the figures. For example, two blocks shown in succession may, in fact, be accomplished as one step, executed concurrently, substantially concurrently, in a partially or wholly temporally overlapping manner, or the blocks may sometimes be executed in the reverse order depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although the present disclosure has been described in terms of specific embodiments, it is anticipated that alterations and modifications thereof will become apparent to the skilled in the art. The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or the technical improvement over technologies found in the marketplace or to enable others of ordinary skill in the art to understand the embodiments disclosed herein. Therefore, it is intended that the following claims be interpreted as covering all such alterations and modifications as fall within the true spirit and scope of the disclosure.

What is claimed is:

1. A system, said system comprising:
a memory; and
a processor in communication with said memory, said processor being configured to perform operations, said operations comprising:
extracting a first multiple dimensional dataset and a second multiple dimensional dataset;
encoding said first multiple dimensional dataset into a first encoded dataset and said second multiple dimensional dataset into a second encoded dataset, wherein a first key decodes said first encoded dataset, wherein a second key decodes said second encoded dataset, and wherein said first key is distinct from said second key;
combining said first encoded dataset and said second encoded dataset into a combined encoded dataset; and
conveying said combined encoded dataset to a display device, wherein a first decoding device distinct from said display device is equipped with said first key which enables a first user to decode said first multiple dimensional dataset from said first encoded dataset within said combined encoded dataset on said display device, and wherein a second decoding device distinct from said display device is equipped with said second key which enables a second user to decode said second multiple dimensional dataset from said second encoded dataset within said combined encoded dataset on said display device.

2. The system of claim 1, further comprising:
decoding said combined encoded dataset.

3. The system of claim 2, further comprising:
revealing said first encoded dataset by decoding said combined encoded dataset.

4. The system of claim 1, wherein:
said first multiple dimensional dataset is a video.

5. The system of claim 1, wherein:
said first decoding device is a smart device.

6. A computer-implemented method, said computer-implemented method comprising:
extracting a first multiple dimensional dataset and a second multiple dimensional dataset;
encoding said first multiple dimensional dataset into a first encoded dataset and said second multiple dimensional dataset into a second encoded dataset, wherein a first key decodes said first encoded dataset, wherein a second key decodes said second encoded dataset, and wherein said first key is distinct from said second key;
combining said first encoded dataset and said second encoded dataset into a combined encoded dataset; and
conveying said combined encoded dataset to a display device, wherein a first decoding device distinct from said display device is equipped with said first key which enables a first user to decode said first multiple dimensional dataset from said first encoded dataset within said combined encoded dataset on said display device, and wherein a second decoding device distinct from said display device is equipped with said second key which enables a second user to decode said second multiple dimensional dataset from said second encoded dataset within said combined encoded dataset on said display device.

7. The computer-implemented method of claim 6, further comprising:
decoding said combined encoded dataset.

8. The computer-implemented method of claim 7, further comprising:
revealing said first encoded dataset by decoding said combined encoded dataset.

9. The computer-implemented method of claim 7, wherein:
said combined encoded dataset is decoded using a wearable device.

10. The computer-implemented method of claim 9, wherein:
said wearable device decodes said combined encoded dataset to reveal said first encoded dataset.

11. The computer-implemented method of claim 9, wherein:
said wearable device decodes said combined encoded dataset with a decoding key personalized to said user.

12. The computer-implemented method of claim 6, wherein:
said first multiple dimensional dataset is a video.

13. The computer-implemented method of claim 12, wherein:
said video is encoded at a frame level of granularity.

14. The computer-implemented method of claim 6, wherein:
said first decoding device is a smart device.

15. A computer program product, said computer program product comprising a computer readable storage medium having program instructions embodied therewith, said program instructions executable by a processor to cause said processor to perform a function, said function comprising:
extracting a first multiple dimensional dataset and a second multiple dimensional dataset;
encoding said first multiple dimensional dataset into a first encoded dataset and said second multiple dimensional dataset into a second encoded dataset, wherein a first key decodes said first encoded dataset, wherein a second key decodes said second encoded dataset, and wherein said first key is distinct from said second key;
combining said first encoded dataset and said second encoded dataset into a combined encoded dataset; and
conveying said combined encoded dataset to a display device, wherein a first decoding device distinct from said display device is equipped with said first key which enables a first user to decode said first multiple dimensional dataset from said first encoded dataset within said combined encoded dataset on said display device, and wherein a second decoding device distinct from said display device is equipped with said second key which enables a second user to decode said second multiple dimensional dataset from said second encoded dataset within said combined encoded dataset on said display device.

16. The computer program product of claim 15, further comprising:
decoding said combined encoded dataset.

17. The computer program product of claim 15, further comprising:
revealing said first encoded dataset by decoding said combined encoded dataset.

18. The computer program product of claim 16, further comprising:
revealing said first encoded dataset by decoding said combined encoded dataset.

19. The computer program product of claim 15, wherein:
said first multiple dimensional dataset is a video.

20. The computer program product of claim 15, wherein:
said first decoding device is a smart device.

\* \* \* \* \*